United States Patent

[11] 3,610,395

| [72] | Inventor | Joseph A. Amori<br>1270 Pine Ave., San Jose, Calif. 95125 |
|---|---|---|
| [21] | Appl. No. | 829,013 |
| [22] | Filed | May 29, 1969 |
| [45] | Patented | Oct. 5, 1971 |

[54] FEEDER APPARATUS FOR FRUIT HANDLING MACHINE
4 Claims, 8 Drawing Figs.

[52] U.S. Cl.................................................... 198/30,
302/14
[51] Int. Cl....................................................B65g 47/26,
B65g 53/30
[50] Field of Search.......................................... 198/25, 33
R, 103, 30; 302/14

[56] References Cited
UNITED STATES PATENTS

| 2,916,133 | 12/1959 | Copping ....................... | 198/30 |
| 3,288,265 | 11/1966 | Smith ........................... | 198/30 |

*Primary Examiner*—Edward A. Sroka
*Attorney*—Naylor & Neal

ABSTRACT: Feeder apparatus for fruit handling machines including a water tank to receive fruit in bulk and render it buoyant, a pocket conveyor having a fruit-receiving reach movable angularly upwardly and outwardly of said tank to receive buoyant fruit and remove the same from said tank, said conveyor including means for removing excess fruit from the pockets thereof, means for retaining fruit in said pockets to the extent of one fruit per pocket, and means for transferring fruit from said pockets to a fruit handling machine.

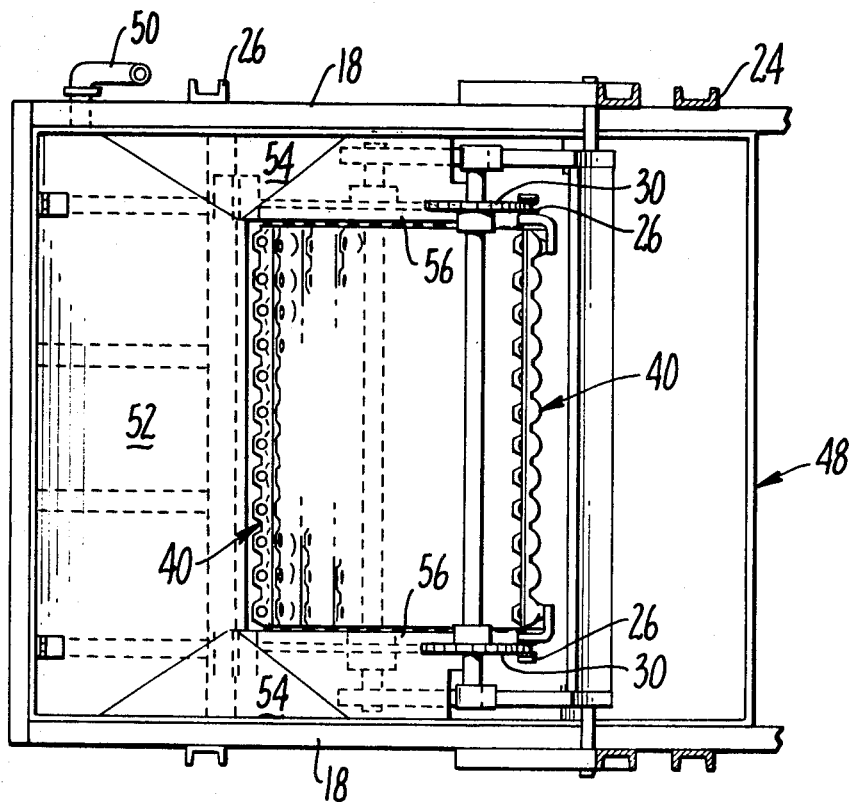
FIG. 2.
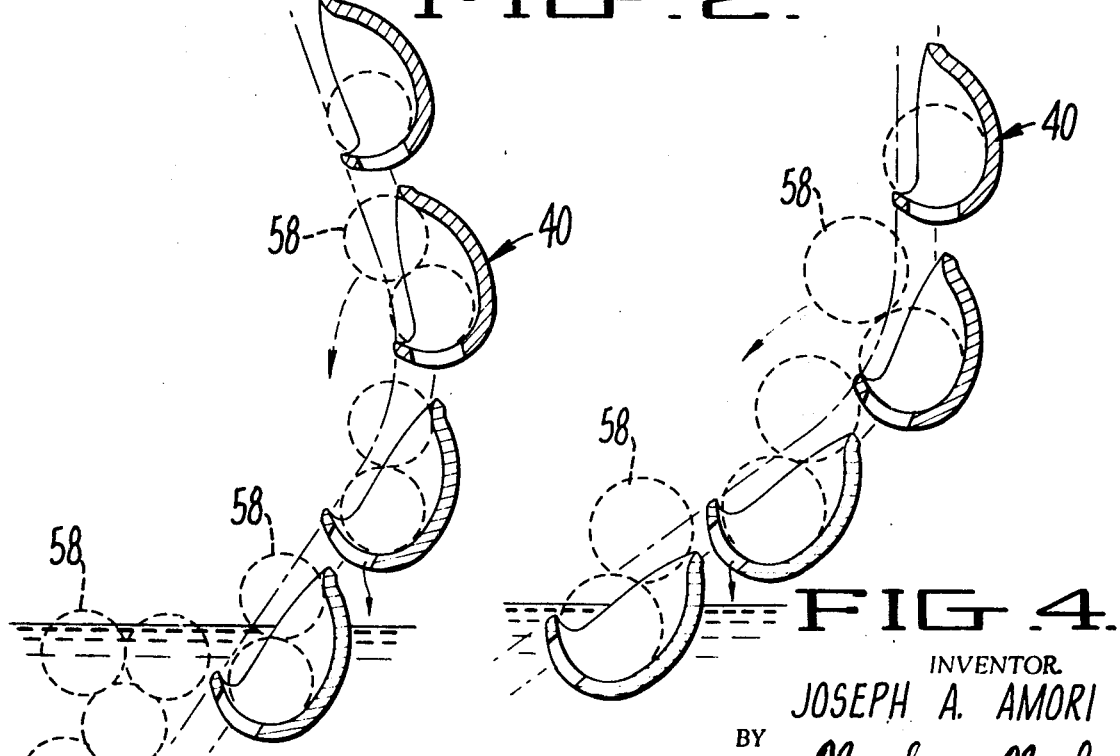
FIG. 3.
FIG. 4.
INVENTOR.
JOSEPH A. AMORI
BY
Naylor & Neal
ATTORNEYS INVENTOR.
JOSEPH A. AMORI
BY Naylor & Neal
ATTORNEYS

FEEDER APPARATUS FOR FRUIT HANDLING MACHINE

The objects and advantages of the invention will be apparent from the following description taken in conjunction with the drawings forming part of the specification, and in which:

FIG. 2 is a view taken along lines 2—2 of FIG. 1;

FIG. 3 is an enlarged view in cross section of a portion of a row of pockets of the pickup conveyor;

FIG. 4 is a view similar to that of FIG. 3 but showing said pockets in a different positional orientation;

Figure 1:
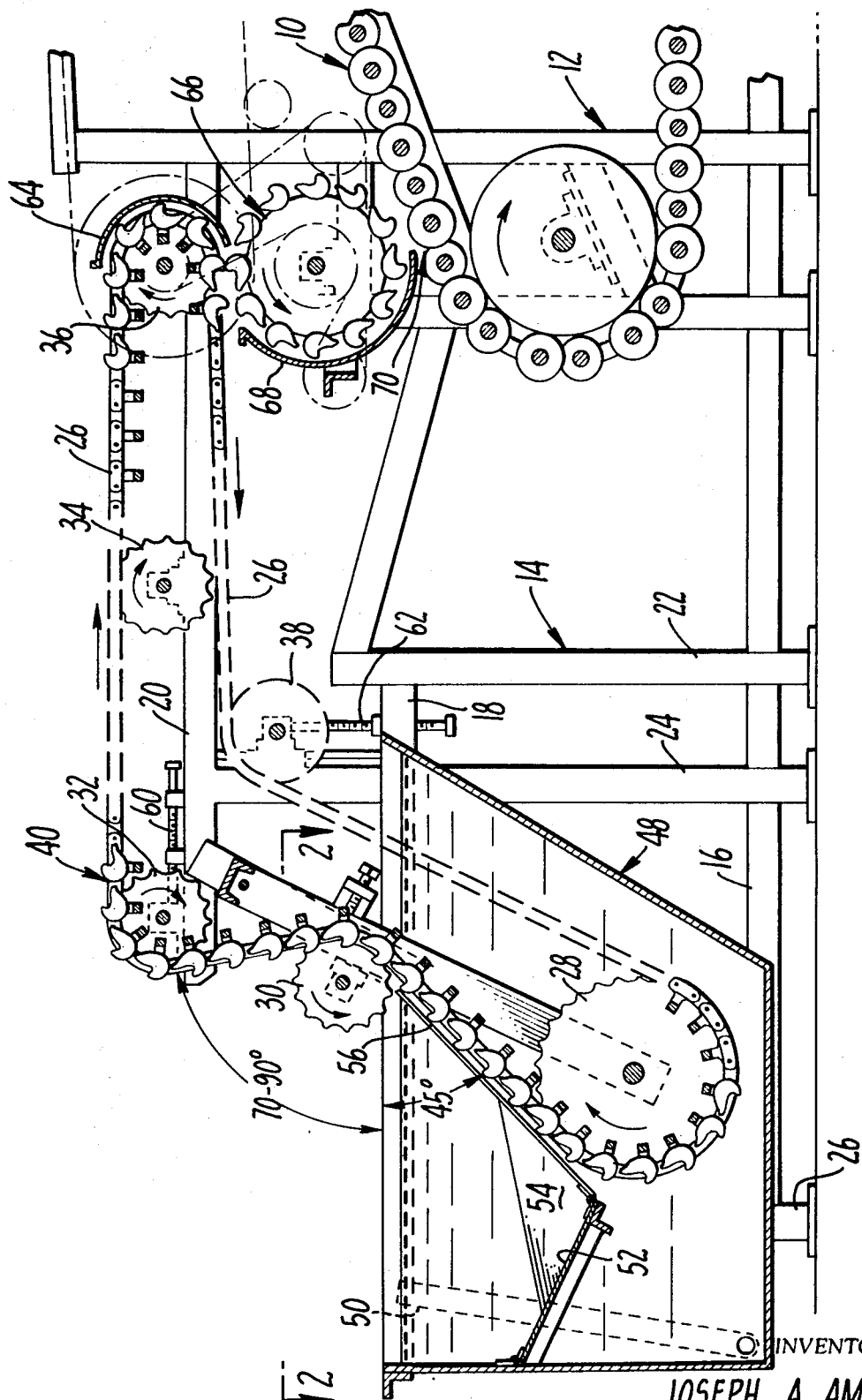
FIG. 1 is a partly sectionalized view in side elevation of the apparatus of the invention.
Figure 5:
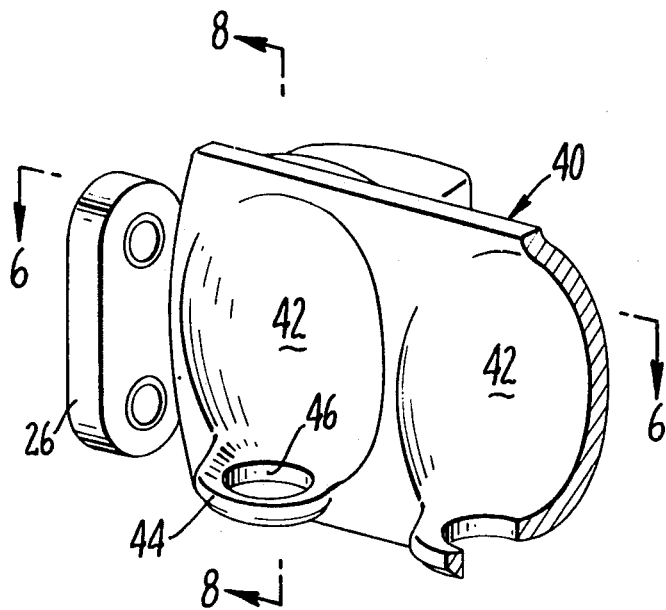
FIG. 5 is a view in perspective of an end portion of a pocket-defining chuck forming part of the mentioned conveyor.
Figure 6:
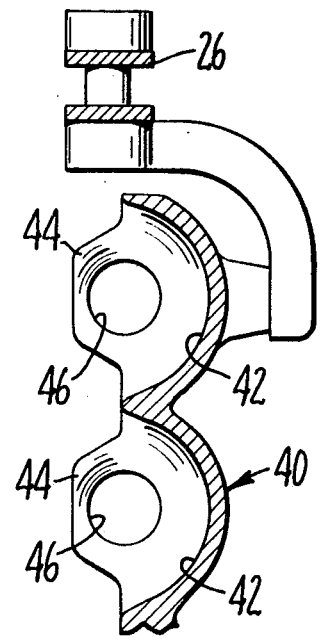
FIG. 6 is a view taken along lines 6—6 of FIG. 5.
Figure 7:
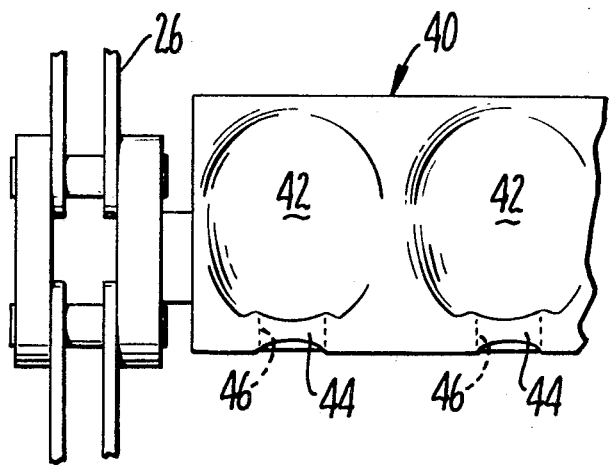
FIG. 7 is a view in front elevation of the chuck portion of FIG. 5.
Figure 8:
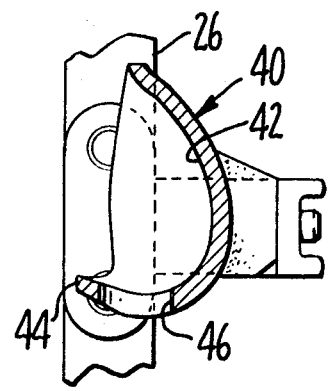
FIG. 8 is a view taken along lines 8—8 of FIG. 5.

With reference to FIG. 1, conveyor is a fruit-orienting conveyor of the type shown and described in U.S. Pat. No. 2,827,089, and frame 12 constitutes part of the support therefor.

Interconnected with framework 12 is another framework indicated generally at 14 and comprised of mutually interconnected horizontal members 16, 18 and 20 and vertical members 22, 24 and 26, said framework 14 constituting the structural support means for the feeder apparatus of the invention.

Said feeder apparatus includes a conveyor which comprises chains 26 trained around sprocket pairs 28, 30, 32, 34, 36 and 38. Conveyor bars or chucks indicated generally at 40 are attached to and supported by chains 26. Each bar or chuck has formed therein a plurality of pockets 42, fruit pickup lips 44, and apertures 46 formed in the lips 44 serving as fruit positioning and water draining means for the pockets.

The fruit pickup portion of the described conveyor is disposed within water tank 48 having therein an angularly adjustable overflow pipe 50, a bottom baffle 52, side baffles 54, and guards 56 for the chains 26.

Fruit to be picked up by the conveyor are dumped within the tank 48 and supported in buoyant condition therein by baffles 52 and 54 and by the pickup reach of the conveyor which extends between sprockets 28 and 30, said pickup reach defining an angle with the horizontal of about 45°.

As the pickup reach of the conveyor moves upwardly within the water, each of the pockets 42 receives one, and frequently more than one, fruit 58 (FIG. 3). Defined between sprockets 30 and 32 is an ejection reach of the conveyor which defines a variable angle with the horizontal from approximately 70° to approximately 90°, the variation of this angle being accomplished by horizontal movement of the sprockets 32 through adjustment means 60. As the pockets 42 move through this ejection reach of the conveyor, fruit in excess of one within each pocket is caused to drop out of the pocket, as illustrated in FIGS. 3 and 4. The angle of the ejection reach with respect to the horizontal is adjusted toward the 70° extreme for the handling of smaller fruit and for ensuring that such fruit in excess of one per pocket are removed therefrom, as illustrated in FIG. 3. As illustrated in FIG. 4, the angle between the ejection reach and the horizontal may be adjusted toward the 90° extreme in order to accomplish the removal from the pockets of larger fruit in excess of one per pocket. The chain takeup sprockets 38 are adjustable upwardly and downwardly by means 62 to compensate for positional adjustment of sprockets 32.

Arcuate skid plate 64 prevents removal of the fruit from the pockets 42 until the fruit reach the end of this skid plate. A drum conveyor indicated generally at 66 and comprising bars or chucks corresponding to the bars or chucks 40 is adapted to have the pockets thereof filled by the fruit which leave the pockets of the pickup conveyor as the end of skid plate 64 is reached. Drum conveyor 66 is a transfer conveyor adapted to transfer fruit from the pickup conveyor to the fruit pockets of the conveyor 10 of the fruit handling machine. For this purpose, conveyor 66 has associated therewith an arcuate skid plate 68 adapted to retain the fruit in association with the respective pockets of conveyor 66 until such pockets are brought into registry with the pockets 70 of conveyor 10.

With the feeder apparatus of the invention, the fruit pockets of the conveyor 10 of the fruit handling machine are filled to substantially 100 percent capacity with singleton fruit. This is due to the fact that the pockets 42 of the feeder conveyor become filled with fruit to the extent of substantially 100 percent capacity during the course of movement through the pickup reach of said conveyor and due to the fact that fruit in excess of one per pocket are eliminated from the conveyor during the course of passage of the pockets through the ejection reach of the conveyor.

A further advantage of employing a water environment for fruit pickup is that the effective weight of the fruit is substantially reduced by the buoyancy effect imparted by the water, and hence even soft overripe fruit can be handled in this pickup system.

What is claimed is:

1. Fruit pickup and conveying apparatus comprising a tank, a conveyor having fruit-receiving pockets defined therein, each pocket being adapted to receive a plurality of fruit, said conveyor having a fruit pickup reach disposed within said tank and extending upwardly therein at a first acute angle with respect to the horizontal, means in said tank adapted to assist bulk fruit within said tank toward and onto said pickup reach, said means comprising water within which said pickup reach and said bulk fruit are immersed, said conveyor having a fruit rejection reach disposed above said tank and inclined at a second acute angle with respect to the horizontal whereby fruit in excess of one per pocket will be gravity-discharged from said conveyor during traverse of said rejection reach.

2. The apparatus of claim 1, said means further comprising inclined baffle means.

3. The apparatus of claim 1, said first acute angle being about 45°, said second acute angle having a value of from about 70° to about 90°.

4. Fruit pickup and conveying apparatus comprising a tank, a conveyor having fruit-receiving pockets defined therein, said conveyor having a fruit pickup reach disposed within said tank and extending upwardly therein at an angle of about 45° with respect to the horizontal, means in said tank adapted to assist bulk fruit within said tank toward and onto said pickup reach, said means comprising water within which said pickup reach and said bulk fruit are immersed, said conveyor having a fruit rejection reach disposed above said tank and inclined at an angle of from about 70° to about 90° with respect to the horizontal, whereby fruit in excess of one per pocket will be gravity-discharged from said conveyor during traverse of said rejection reach, said conveyor being comprised of bars or chucks having defined therein at the trailing ends of said pockets lips and fruit-seating apertures adapted to prevent the remaining fruit within said pockets from falling out of the same during traverse of said rejection reach.